Oct. 29, 1929.　　　　　M. CHRISTMAN　　　　　1,733,401
JOURNAL BOX
Filed March 29, 1928　　　2 Sheets-Sheet 1
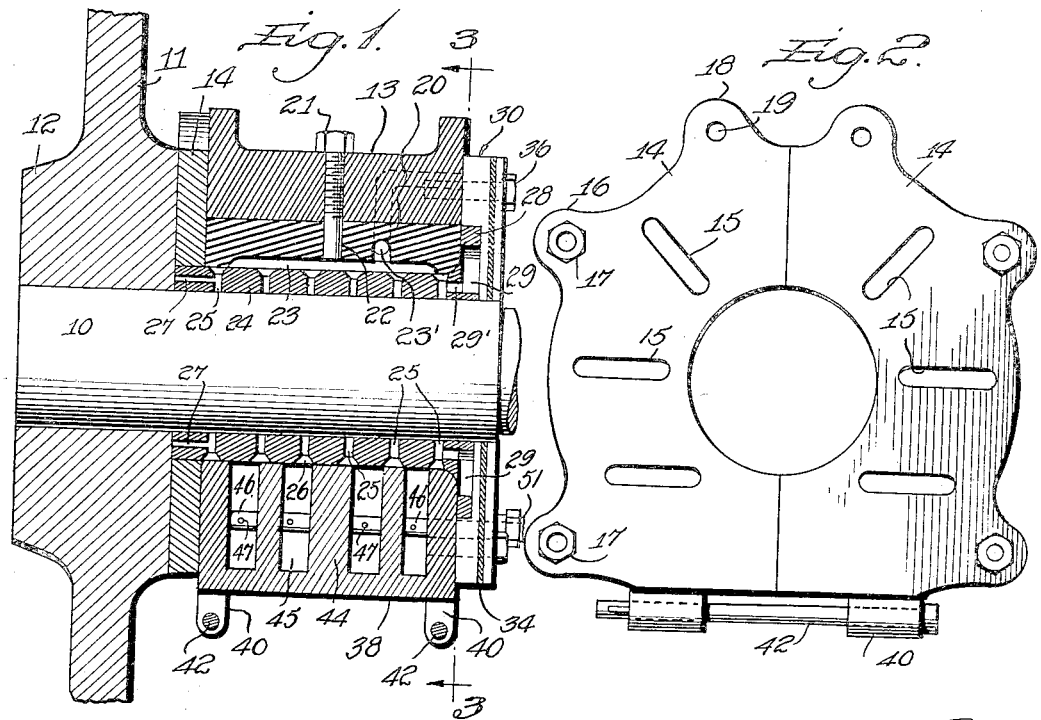
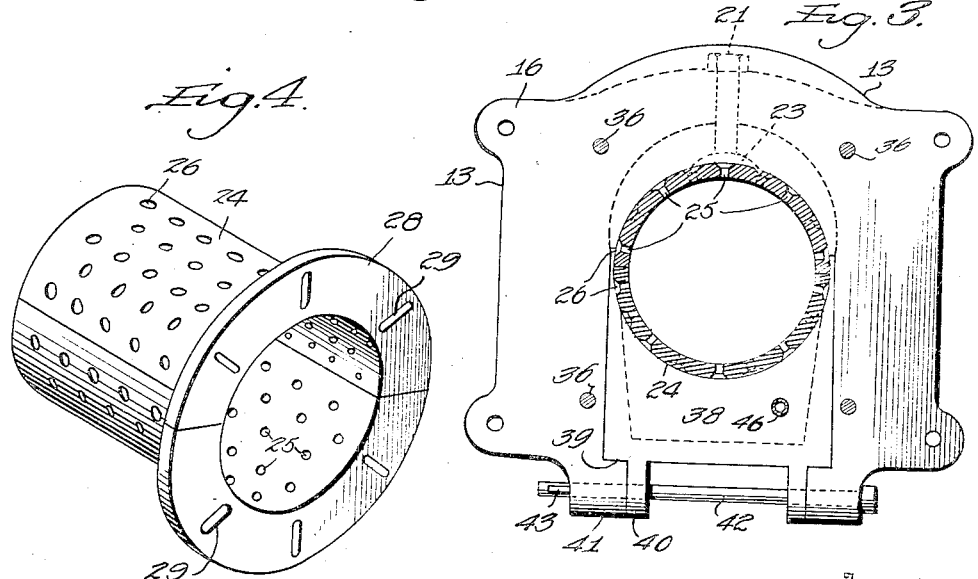
Inventor
MATTHIAS CHRISTMAN
By
C. L. Parker, Jr.
Attorney Oct. 29, 1929.　　　M. CHRISTMAN　　　1,733,401
JOURNAL BOX
Filed March 29, 1928　　2 Sheets-Sheet 2

Inventor
MATTHIAS CHRISTMAN
By C. L. Parker, Jr.
Attorney

Patented Oct. 29, 1929

1,733,401

UNITED STATES PATENT OFFICE

MATTHIAS CHRISTMAN, OF SPRINGFIELD, MISSOURI

JOURNAL BOX

Application filed March 29, 1928. Serial No. 265,683.

This invention relates to journal boxes.

An important object of the invention is to provide an improved journal box particularly adapted for railway vehicles and provided with novel means for supplying lubricant to the axle and associated bearing surfaces.

A further object is to provide a journal box of the character referred to having a novel lubricant container and means associated therewith for supplying lubricant to the axle and the bearing surfaces therefor.

A further object is to provide a journal box having a novel bushing for rotatably supporting the axle and adapted to be readily removed for replacement purposes without disturbing the wheels of the vehicle.

A further object is to provide a bushing of the character referred to and novel means for retaining it in position in the journal box to permit its ready removal therefrom.

A further object is to provide a journal box having an axle bushing therein provided with novel means for supplying lubricant to the axle, to the adjacent faces of the hub of the wheel, and to the means for retaining the bushing in position.

A further object is to provide a novel lubricant container and means for supplying lubricant therefrom under pressure to the contacting surfaces of the axle and the bearing means therefor.

Other objects and advantages of the invention will become apparent during the course of the following description.

Figure 5:
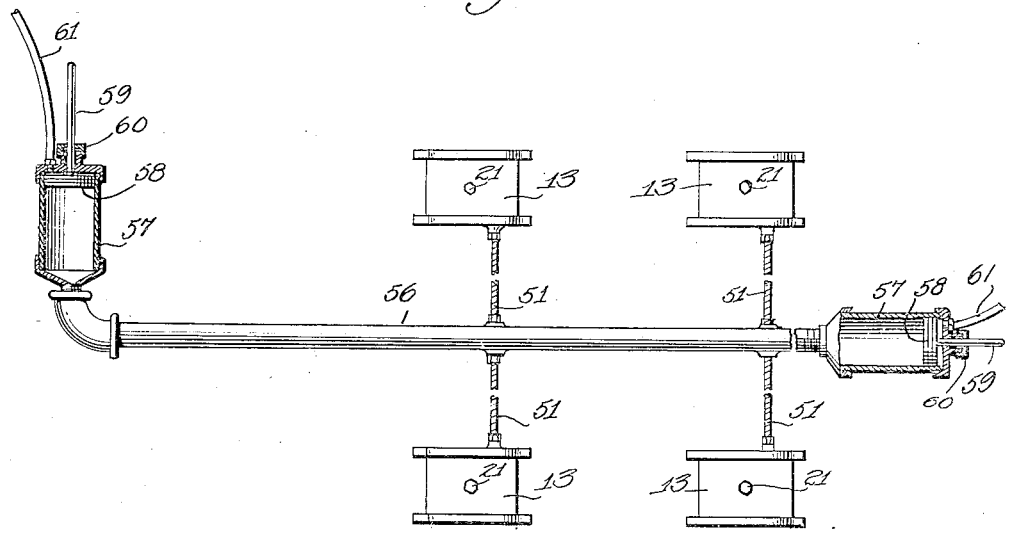
Figure 7:
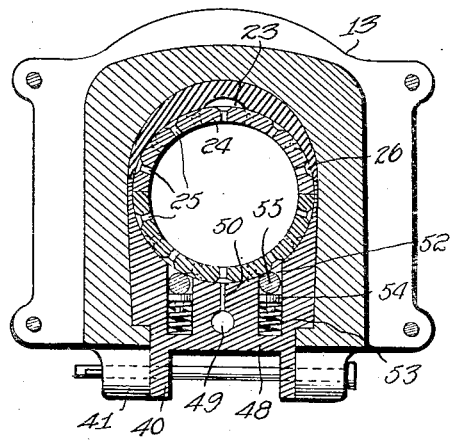
Figure 6:
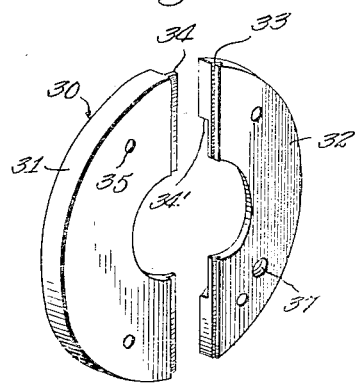
Figure 8:
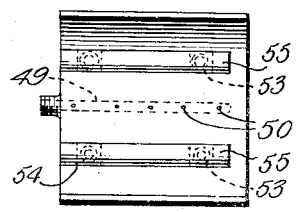

In the drawings I have shown several embodiments of the invention. In this showing, Figure 1 is a central vertical sectional view through the journal box and associated elements, parts being shown in elevation, Figure 2 is a face view of the hub liner, Figure 3 is a section substantially on line 3—3 of Figure 1, Figure 4 is a detail perspective view of the hub liner, Figure 5 is a plan view of the lubricant supplying system, parts being shown in section, and parts being broken away, Figure 6 is a detail perspective view of the bushing retaining member, the parts thereof being separated, Figure 7 is a transverse vertical sectional view through a modified form of journal box, and, Figure 8 is a plan view of a modified form of lubricant supplying device and associated elements.

Referring to the drawings, the numeral 10 designates an axle of a railway vehicle upon which is mounted the usual wheel 11 having a hub 12. The axle 10 extends through a journal box 13, as shown in Figure 1.

A hub liner comprising a pair of complementary sections 14 is arranged between the journal box and the adjacent face of the hub 12, and is provided in its outer face with lubricant receiving grooves 15 which preferably extend approximately half way through the metal of the hub liner, but may be extended entirely through the liner if so desired. These lubricant grooves preferably are elongated and arranged as shown in Figure 2, and are formed in the face of the hub liner which engages the hub 12. The hub liner and journal box are provided with outstanding ears 16 for the reception of bolts 17 by means of which the hub liner is secured to the journal box. Supplemental ears 18 extend upwardly from the top portions of the hub liner sections and are provided with openings 19 adapted to be engaged by suitable tools or the like to permit the sections of the hub liner to be placed in position or removed.

An inner liner 20 is arranged within the journal box and may be secured against movement with respect thereto by a pin 21 threaded in the upper wall of the journal box and extending through an opening 22 formed in the liner 20. The liner 20 is employed in connection with standard types of journal boxes, but it will be apparent that the boxes may be made to eliminate the space usually provided in which the liner is arranged. It also will be apparent that the liner may be secured in position by any suitable means other than by the use of the pin 21. The liner is provided in its lower face with a lubricant groove 23 for a purpose to be described.

A floating bushing comprising a pair of complementary members 24 surrounds the axle, within the journal box, as shown in Figures 1 and 3. The bushing is substantially cylindrical throughout the greater portion of its length from one end thereof, and is provided in such cylindrical portion with a plurality of openings 25, the outer ends 26 of which are preferably tapered to increase in diameter. The openings 25 are preferably arranged in staggered rows, as shown in Figure 4.

The outer end of the bushing 24 preferably extends through the hub liner 14 as shown in Figure 1, to engage the adjacent face of the hub 12 of the wheel 11. This end portion of the bushing is provided with a plurality of small passages 27 to supply lubricant from the outermost openings 25 to the face of the hub. When the construction just described is employed, it will be apparent that the central opening in the hub liner 14 fits around the adjacent end of the bushing 24 with sufficient clearance to prevent binding against the latter. If desired, however, the hub liner may be made to surround the axle and abut the end of the bushing 24. Under such conditions, the hub liner will be provided with openings in alinement with the openings 27.

The outer end of the bushing 24 is provided with an annular flange 28 having openings 29 extending therethrough, these openings preferably being radially elongated. The openings 29 communicate through openings 29' with the outermost openings 25 of the bushing 24. The bushing 24 is adapted to slowly rotate while the device is in operation, for a purpose to be described, the inner face of the flange 28 contacting with the adjacent end face of the liner 20 and the journal box.

A bushing retaining member 30 (see Figure 6) is adapted to retain the bushing 24 in position against longitudinal displacement in one direction, displacement in the opposite direction obviously being prevented by the flange 28. The member 30 comprises a pair of complementary members 31 and 32, the latter being provided in its inner edge with a groove 33 adapted to receive a tongue 34 carried by the section 31. The inner face of the member 30 is annularly grooved as at 34' to receive the flange 28 of the bushing 24, this flange having sufficient clearance with respect to the associated stationary elements to prevent any binding action against the flange. The complementary members of the retaining member 30 are provided with openings 35 for the reception of screws 36 passing into the journal box to secure the member 30 in position. One of the elements of the retaining member 30 also is provided with a larger opening 37 for a purpose to be described. A lubricant containing device 38 is arranged in the bottom of the journal box, as shown in Figures 1 and 3. The journal box is open at the bottom in the usual manner, and is provided with longitudinal shoulders 39 on which the bottom of the container 38 rests. The shoulders 39 and the contacting portions of the lubricant container preferably are inclined slightly to permit the ready removal of the container. Ears 40 and 41 are carried by the container 38 and the journal box, respectively, and pins 42 extend through these ears to prevent the lubricant container from sliding outwardly from its normal postion. Cotter pins 43 are preferably employed for positively preventing sliding movement of the pins 42.

The container 38 is hollow and is divided by a plurality of preferably integral cast partitions 44 to form lubricant receiving chambers 45. A pipe 46 extends through the opening 37 in the retaining member 30 and through a similar opening in the front wall of the lubricant container. This pipe also extends through the partitions 44 and is provided in each chamber 45 with an opening 47 to deliver lubricant thereto.

The form of the invention shown in Figure 7 is substantially the same as that previously described except that a different type of lubricant container 48 is employed. This container is provided with a longitudinal passage 49 adapted to be supplied with lubricant by the same means employed in connection with the pipe 46, to be referred to in detail later. A plurality of small passages 50 extend from the passage 49 to the upper face of the container 48 to deliver lubricant to the openings 25. Lubricant is adapted to be supplied to the pipe 46 or passage 49, through a flexible hose 51. One of these hoses is connected to each journal box 13 as shown in Figure 5.

The container 48 is provided with a pair of recesses 52 in which are arranged springs 53 contacting at their upper ends with followers 54. Rollers 55 rest upon these followers and are adapted to engage the lower portion of the bushing 24, as shown in Figure 7.

In either form of the invention, lubricant may be supplied to the groove 23 by means of a passage 23' adapted for connection to one of the flexible connections 51. When the passage 23' is not used, the outer end thereof may be closed by a suitable plug as will be apparent.

Referring to Figure 5, the numeral 56 designates a main lubricant supply pipe into which each of the flexible hoses 51 is tapped. A cylinder 57 may be connected to each end of the pipe 56, each cylinder being provided with a reciprocating piston 58. Piston rods 59 are connected to the pistons and extend through stuffing boxes 60. The pistons 58 may be operated manually by suitable handles connected to the piston rods 59, but when air under pressure is available, it is preferred to connect flexible hoses 61 to the cylinders to operate the cylinders 58 by air pressure.

The operation of the device is as follows:

Lubricant is supplied under pressure to the pipe 46 by inward movement of either or both of the pistons 58, through pipe 56 and hoses 51. The application of pressure may be either continuous or intermittent, as will be apparent. The lubricant thus will be fed under pressure into the chambers 45 through openings 47, and thus will be forced upwardly through the openings 25 to the surface of the axle. The bushing 24 is not clamped in position in any manner, but is mounted to float within the journal box. Accordingly the bushing slowly rotates during the rotation of the axle, and successive openings 25 are brought into communication with the lubricant chambers 45 to receive lubricant therefrom. Thus it will be apparent that lubricant in ample quantities will be supplied to the bearing surfaces.

It is the usual practice to provide a single brass in a journal box, arranged over the axle, and wear takes place against the bearing surface of the brass substantially at the same points. With the present construction, this wear will be constantly distributed due to the floating arrangement of the bushing. The groove 23 is maintained full of lubricant, and accordingly it will be apparent that ample quantities of lubricant will be supplied to the upper portion of the bushing to minimize wear from the adjacent portions of the axle.

Lubricant flows into the openings 29 of the flange 28 through the openings 29'. The flange 28 rotates with respect to the retaining member 30 and the adjacent faces of the liner 20, journal box and lubricant container 38, and the contacting surfaces referred to are lubricated by grease from the openings 29. Similarly grease will flow through the passages 25 to afford lubricant for the inner face of the hub 12, the lubricant gradually collecting in the grooves 15 to maintain lubricant in the hub liner 14. Thus it will be apparent that lubricant is effectually distributed over the entire inner surface of the hub.

When it is desired to remove the bushing for any purpose, the bolts 36 are removed, whereupon the complementary sections 31 and 32 of the retaining member 30 may be drawn outwardly. The tongue and groove arrangement at the edges of the members 31 and 32 is provided to maintain the complementary sections in proper position with respect to each other whereby the retaining member seats properly against the adjacent face of the journal box. Upon removal of the elements of the retaining member 30, the bushing 24 then may be slidably withdrawn from the journal box.

The lubricant container 38 also is slidably mounted in the bottom of the journal box and readily may be withdrawn therefrom by removing the pins 42. The forming of the hub liner 14 in complementary sections also permits this element to be removed by removal of the bolts 17.

Thus it will be apparent that all of the elements of the device are adapted to be readily removed or replaced without dropping the axle. In order to remove the parts in the manner described, it merely is necessary to relieve the axle of the weight of the vehicle.

The operation of the form of the device shown in Figures 7 and 8 is substantially the same as that previously described. Lubricant is supplied under pressure to the passage 49, and thence to the openings in the bushing through the passages 50. The rollers 55 contact with the bottom of the bushing and are projected upwardly by the springs 53 to take up any play between the parts, as will be obvious.

It is to be understood that the forms of the invention herewith shown and described are to be taken as preferred examples of the same and that various changes in the shape, size and arrangement of parts may be resorted to without departing from the spirit of the invention or the scope of the subjoined claims.

I claim:

1. A device of the character described comprising, a journal box, a journal extending into the journal box, a rotatable floating cylindrical bushing mounted upon the journal and arranged within the journal box, the said floating bushing having a plurality of openings and passages extending from certain of said openings, a hub liner engaging one end of the journal box and the hub of an adjacent wheel, and a retaining member carried by the opposite end of said journal box and contacting with the adjacent end of the floating bushing to prevent longitudinal movement thereof in one direction, said passages leading to the hub and the retaining member.

2. A device of the character described comprising a journal box, a rotatable floating cylindrical bushing mounted in said journal box, a journal extending into the floating bushing, a hub liner held against one end of the journal box, a retaining member carried by the opposite end of said journal box and provided upon its inner face with an annular recess, and an annular flange carried by the floating bushing and arranged within said annular recess.

3. A device of the character described comprising a journal box, a floating cylindrical bushing rotatable within the journal box, a journal extending within the floating bushing, a hub liner secured against one end of said journal box, and a retaining member carried by the opposite end of said journal box and contacting with the adjacent end of said bushing, said bushing being provided with a plurality of radial openings, an annular flange carried by the bushing and provided with radially extending openings, said bushing having passages communicating between certain of the radial openings therein and the openings in the flange, said retaining member being provided upon its inner face with an annular recess to receive the annular flange.

4. A device of the character described, comprising, a journal box, a journal extending into the journal box, a rotatable floating cylindrical bushing arranged within the journal box and mounted upon the journal, a hub liner secured against one end of the journal box, and a retaining member arranged adjacent to the opposite end of said journal box and contacting with the adjacent end of the floating bushing, said retaining member comprising a pair of radially divided complementary members, the contacting edges of said members being provided with co-acting tongues and grooves, and removable means for securing said retaining member to said journal box.

5. A device of the character described comprising a journal box, a journal extending into the journal box, a rotatable floating bushing arranged in the journal box upon said journal, said bushing comprising a pair of complementary semi-cylindrical members having semi-annular flanges, said semi-cylindrical members having openings formed therein and said flanges having openings formed therein with passages connecting certain of the openings in the semi-cylindrical members with certain of the openings in said flanges, a retaining member secured to the opposite end of said journal box and provided upon its inner face with an annular recess to receive said flanges, said retaining member comprising a pair of substantially semi-circular complementary members, a lubricant container arranged within the journal box beneath the floating bushing and having open upper portions conforming in shape to and fitting against the bottom portion of said bushing, and means for supplying a lubricant under pressure to said container.

6. A device of the character described comprising, a journal box, a journal extending into the journal box, a hub mounted upon the journal and arranged near one end of the journal box, a hub liner mounted between the hub and the adjacent end of the journal box and having an opening for the passage of the journal, a cylindrical floating bushing arranged within the journal box and receiving the journal, said bushing having transverse openings and longitudinal passages, said longitudinal passages being arranged to supply a lubricant between the contacting faces of the hub and hub liner, a retaining member carried by the opposite end of the journal box for engagement with a part of the floating bushing, and means to supply a lubricant to certain of the openings in said floating bushing.

7. A device of the character described comprising, a journal box, a journal extending into the journal box, a hub mounted upon the journal and arranged near one end of the journal box, a hub liner mounted between the hub and the adjacent end of the journal box and having an opening for the passage of the journal, a cylindrical floating bushing arranged within the journal box and receiving said journal and having one end extending through the opening in the hub liner for substantial contact with the hub, said bushing having transverse openings and longitudinal passages extending through its end contacting with said hub, a retaining member carried by the opposite end of the journal box for engagement with a part of the floating bushing, and means to supply lubricant to one or more of said transverse openings.

8. A device of the character described comprising, a journal box, a journal extending into the journal box, a cylindrical floating bushing arranged within the journal box and receiving the journal, said bushing having transverse openings and longitudinal passages extending through one end thereof, a retaining member carried by one end of the journal box and contacting with the bushing and receiving lubrication from said longitudinal passages, and means to supply a lubricant to one or more of the transverse openings.

9. A device of the character described comprising, a journal box, a journal extending into the journal box, a cylindrical floating bushing arranged within the journal box and receiving the journal, a flange carried by the bushing, said flange having openings formed therethrough, said bushing having transverse openings and longitudinal passages connecting certain of the transverse openings of the bushing with the openings in the flange, and a retaining member carried by the journal box and having an annular recess to receive said flange.

In testimony whereof I affix my signature.

MATTHIAS CHRISTMAN.

CERTIFICATE OF CORRECTION.

Patent No. 1,733,401.                               Granted October 29, 1929, to

MATTHIAS CHRISTMAN.

It is hereby certified that error appears in the printed specification of the above numbered patent requiring correction as follows: Page 1, line 44, for the words "hub liner" read "floating bushing"; and that the said Letters Patent should be read with this correction therein that the same may conform to the record of the case in the Patent Office.

Signed and sealed this 15th day of April, A. D. 1930.

(Seal)

M. J. Moore,
Acting Commissioner of Patents.